Patented Nov. 6, 1945

2,388,514

UNITED STATES PATENT OFFICE 2,388,514

MODIFIERS FOR POLYMERIZATION OF BUTADIENE-1,3 HYDROCARBONS

Benjamin M. G. Zwicker, Akron, Ohio, and William D. Stewart, Yonkers, N. Y., assignors to The B. F. Goodrich Company, New York, N. Y., a corporation of New York No Drawing. Application May 15, 1944, Serial No. 535,762

17 Claims. (Cl. 260—84.5)

This invention relates to the modification of the polymerization of butadiene-1,3 hydrocarbons to form synthetic rubber products closely resembling natural crude rubber in plasticity and processability, and particularly to the polymerization of butadiene-1,3 hydrocarbons in aqueous emulsion in the presence of a new and improved class of polymerization modifiers.

The polymerization in aqueous emulsion of butadiene-1,3 hydrocarbons either alone or in admixture with each other, or with other organic compounds copolymerizable therewith, to form products more or less resembling natural rubber, is well known. It has been commonly observed, however, that such products often resemble vulcanized natural rubber rather than unvulcanized natural rubber in plasticity and processability unless the polymerization is effected in the presence of small amounts of certain organic compounds called "modifiers" or "regulators" of polymerization.

It has already been disclosed in the copending application of Charles F. Fryling, Serial No. 396,155, filed May 31, 1941, that 2-mercaptothiazoles and their symmetrical sulfides and polysulfides such as 2-mercapto-4,5-dimethylthiazole, 2-mercaptobenzothiazole, benzothiazyl-2 disulfide and the like, modify the emulsion polymerization of butadiene-1,3 hydrocarbons in such a manner that polymers more nearly resembling natural crude rubber are produced. The use of these substances as polymerization modifiers, however, has been seriously limited because of the fact that they retard the polymerization rate, often to such an extent that the presence of polymerization catalysts, along with these compounds, still does not enable the polymerization to be effected in the required short time.

We have now discovered that unsymmetrical sulfides (including both monosulfides and polysulfides) having a thiazyl-2 radical attached to sulfur on the one hand and having a different monovalent organic radical having its monovalency on a carbon atom attached to sulfur on the other hand, are superior as polymerization modifiers to the 2-mercaptothiazoles and their symmetrical sulfides, since their presence during the polymerization of butadiene-1,3 hydrocarbons not only enables more plastic and more readily processable polymers to be produced, but also enables the polymerization to be conducted more rapidly than is generally possible with the free thiazoles or symmetrical sulfides. Accordingly, this invention comprises the polymerization of butadiene-1,3 hydrocarbons in the presence of these new and improved polymerization modifiers.

Any unsymmetrical sulfide of the type described, that is, any compound of the general formula:

$$R-(S)_n-X$$

wherein R is a thiazyl-2 radical, $n$ is a small integer preferably no more than four and X is a monovalent organic radical different from R and having its monovalency on a carbon atom, may be employed as the polymerization modifier in the method of this invention.

While R in the above formula may be any thiazyl-2 radical, that is, any radical containing the structure:

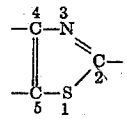

regardless of the nature of the groups attached to the carbon atoms numbered 4 and 5, it is preferred that hydrogen atoms numbered 4 and 5 be attached to groups composed of no elements other than carbon and hydrogen as, for examples, in such radicals as thiazyl-2, 4-methyl-thiazyl-2, 4-ethyl-thiazyl-2, 4,5-dimethyl-thiazyl-2, 4-isopropyl-thiazyl-2, 4-dodecyl-thiazyl-2, 4-phenyl-thiazyl-2, 4-naphthyl-thiazyl-2, 4,5-diphenyl-thiazyl-2 and similar radicals wherein separate groups are attached to the 4 and 5 carbon atoms as well as radicals in which the 4 and 5 carbon atoms are themselves a part of a ring structure such as benzothiazyl-2, naphthothiazyl-2, 4,5-dimethyl benzothiazyl-2, 5-tertiary-butyl-benzothiazyl-2 and the like. However, other radicals containing the above structure wherein the carbons numbered 4 and 5 are attached to groups which may be composed of other non-metallic elements (such as nitrogen, oxygen, sulfur and chlorine), for example, nitro groups, alkoxy groups, thioalkoxy groups, chloro groups and the like whether attached directly to the carbons numbered 4 and 5, or whether they replace hydrogen in hydrocarbon groups attached to these carbons, are also included as examples of the radical R; but it is generally desirable that the radical R be free of functional groups comprising a reactive hydrogen atom such as hydroxyl, carboxy, and amino groups.

The radical X in the general formula above may be any monovalent organic radical having its monovalency on a carbon atom as long as it is a different radical than that represented by R. Thus, the radical X may be a monovalent aliphatic, aromatic, alicyclic or heterocyclic organic radical whether or not containing functional or substituent groups, having its monovalency on a carbon atom. Preferably, radical X is composed only of non-metallic elements; more preferably it is composed of no elements other than carbon, hydrogen, oxygen, nitrogen and sulfur; and still more preferably it contains in addition to carbon, at least one other such element other than hydrogen. Monovalent organic radicals of this latter type in which the terminal carbon atom (the carbon atom bearing the monovalency) is a plurally bound carbon atom, that is, a carbon atom connected by a plural bond to another atom, preferably an atom other than carbon such as oxygen, sulfur or nitrogen; and which are electronegative in character such as aliphatic and aromatic acyl and thioacyl, carbamyl and thiocarbamyl, xanthogenyl and thioxanthogenyl, thiazyl (provided it is different from the thiazyl radical represented by R), thiazolyl, cyano, nitroaryl and the like, are especially preferred radicals represented by X, although other radicals such as hydroxyalkyl, aminoalkyl, arylaminoalkyl, alkyl, alkenyl and other monovalent aliphatic radicals; aminoaryl, chloroaryl, alkoxyaryl, phenacylaryl, and other aromatic radicals and furyl, pyridyl, quinolyl, pyranyl, indolyl and other heterocyclic radicals may also be the radical represented by X.

Specific examples of modifiers of the above-described class include the following:

4-phenyl-thiazyl-2 benzoyl monosulfide
4,5-dimethyl-thiazyl-2 benzoyl monosulfide benzothiazyl-2 benzoyl monosulfide.
4-phenyl-thiazyl-2 thiomethylene hydrin (or 4-phenyl-thiazyl-2 hydroxy-methyl monosulfide)
4,5-dimethyl-thiazyl-2 thiomethylene hydrin
Benzothiazyl-2 cyano monosulfide (nitrile of 2-mercaptobenzothiazole)
4-phenyl-thiazyl-2 cyano monosulfide
4-phenyl-thiazyl-2 ortho-nitrophenyl monosulfide
Benzothiazyl-2 ortho-nitrophenyl disulfide
4-phenyl-thiazyl-2 5-nitrobenzothiazyl-2 monosulfide
4-ethyl-thiazyl-2 acetyl monosulfide
Benzothiazyl-2 acetyl monosulfide
5-tertiary-butyl-benzothiazyl-2 benzoyl monosulfide
Benzothiazyl-2 lauroyl monosulfide
Benzothiazyl-2 dinitrophenyl monosulfide
Benzothiazyl-2 furoyl monosulfide
Benzothiazyl-2 dimethylcarbamyl monosulfide
Benzothiazyl-2 dibutyl-thiocarbamyl monosulfide
4,5-dimethyl-thiazyl-2 4-phenyl-thiazyl-2 monosulfide
4-methyl-thiazyl-2 diphenyl-thiocarbamyl disulfide
Benzothiazyl-2 isopropylxanthogenyl monosulfide
Benzothiazyl-2 2-aminoethyl monosulfide
Benzothiazyl-2 thioethylene hydrin (or benzothiazyl-2 2-hydroxy ethyl monosulfide)
5-nitrobenzothiazyl-2 quinolyl-2 monosulfide
4,5-dimethyl-thiazyl-2 anilino-methyl monosulfide
4,5-dimethyl-thiazyl-2 cetyl monosulfide
Benzothiazyl-2 ethyl monosulfide
Benzothiazyl-2 ethyl disulfide
Benzothiazyl-2 phenyl trisulfide
Benzothiazyl-2 benzyl monosulfide
Benzothiazyl-2 phenyl tetrasulfide.

In the practice of the invention monomeric butadiene-1,3 hydrocarbons either alone or in admixture with other copolymerizable monomers, preferably styrene or acrylonitrile, are polymerized in aqueous emulsion in the presence of any of the above-described modifiers. In this process the monomeric materials to be polymerized are emulsified in water with the aid of a suitable emulsifying agent; the modifier of polymerization, together preferably with an initiator of polymerization and, if desired, with catalysts and accelerators of polymerization or other substances necessary or desired for some purpose, are included in the emulsion and polymerization is then effected at a temperature of about 20 to 100° C. preferably with constant agitation of the emulsion, for a time sufficient to convert a predominant amount, preferably from 75 to 100%, of the monomers into polymers. If the polymerization is conducted only for a time less than is required for substantially complete conversion of monomers into polymers, the polymerization may be terminated at the desired conversion by addition of polymerization inhibitors such as phenyl beta naphthylamine, beta-naphthol and hydroquinone, such substances also serving to stabilize the polymer formed against oxidation. Another alternative in this process consists in adding the modifier of polymerization, or any of the other ingredients, to the emulsion continuously or in stages during the course of the polymerization rather than prior to polymerization. Furthermore, the emulsion polymerization may be carried out in batch operation or it may be effected in a continuous process.

This method of polymerization, employing the 2-thiothiazyl modifiers described, is applicable to any polymerizable butadiene-1,3 hydrocarbon such as butadiene-1,3, isoprene, 2,3-dimethyl butadiene-1,3, piperylene, 2-ethyl butadiene-1,3, 2-phenyl butadiene-1,3 and the like either alone or in admixture in any suitable proportion with each other or with other unsaturated polymerizable compounds copolymerizable therewith in aqueous emulsion. Compounds copolymerizable with butadiene-1,3 hydrocarbons are generally compounds of the structure

wherein from two to three of the disconnected valences are attached to hydrogen atoms, and are preferably compounds of this

structure wherein additionally at least one of the disconnected valences is attached to an electronegative group such as chlorine, cyano or organic groups comprising a plural linkage such as aryl groups, groups containing a

structure, a

structure, a

structure or the like. Such compounds include, in addition to other butadiene-1,3 hydrocarbons, other conjugated dienes containing the general structure

wherein at least two of the disconnected valences are attached to hydrogen and at least one is attached to a similar

group such as chloroprene, 2-cyano butadiene-1,3 cyclopentadiene, myrcene, and the like and monoolefinic copolymerizable compounds (compounds containing a single olefinic double bond present in the structure

wherein from two to three of the disconnected valences are attached to hydrogen, and particularly those containing a single olefinic double bond present in a

structure wherein at least one of the disconnected valences is attached to an electronegative group) such as styrene, vinyl naphthalene, para-chloro styrene, para-methoxy styrene, alpha-methyl styrene and other aryl olefins having an aryl group attached to a carbon atom of a

group; acrylonitrile, methacrylonitrile, alpha-chloro acrylonitrile, methyl acrylate, methyl methacrylate, methallyl methacrylate, methyl alpha-chloro acrylate, acrylic acid, acrylamide, methacrylamide and other polymerizable acrylic compounds possessing a

group; vinyl methyl ketone, acrolein, methyl isopropenyl ketone, methyl vinyl ether, methyl vinyl ethynyl carbinol, diethyl fumarate, diallyl maleate, vinyl acetate, vinyl pyridine, vinylidene chloride, isobutylene and other monoolefinic unsaturated hydrocarbons, ethers, acids, alcohols, aldehydes, ketones, and esters of the character described. When mixtures of butadiene-1,3 hydrocarbons with such copolymerizable compounds are employed it is preferable that the butadiene-1,3 hydrocarbon be present in a predominant amount, that is, to the extent of at least 50% by weight of the mixture.

As mentioned hereinabove, in the polymerization of the butadiene-1,3 hydrocarbon in aqueous emulsion in the presence of the modifiers of this invention, it is generally necessary to employ one or more emulsifying agents. The nature of the emulsifying agents so used may be varied widely, any substance capable of maintaining an aqueous emulsion of the butadiene-1,3 hydrocarbons being effective for this purpose. Suitable emulsifying agents include fatty acid soaps, such as sodium oleate, ammonium linoleate, sodium myristate and the like and soaps of rosin and hydrogenated or dehydrogenated rosin acids such as sodium abietate and sodium dihydroabietate; synthetic saponaceous materials including hymolal sulfates and alkaryl sulfonate such as sodium lauryl sulfate and sodium isopropyl naphthalene sulfonate; salts of organic bases containing long carbon chains such as lauryl amine hydrochloride, trimethylcetylammonium methyl sulfate and C-cetyl betaine; and non-polar emulsifying agents such as the condensation product of lauryl alcohol and ethylene oxide. The choice of the emulsifying agent will depend primarily upon whether it is desired to polymerize in an acid, alkaline or neutral emulsion, all such emulsions of varying pH being effective with the modifiers described, although alkaline emulsions using soaps as emulsifying agents are preferred. The amount of the emulsifying agent may also be varied widely and is not critical but in general amounts of from 1 to 5% based on the material polymerized are preferred, this amount corresponding to considerably less than 5% based on the water present in the emulsion since the amount of polymerizable material is generally less than that of the water present.

In addition to the 2-thiothiazyl modifiers, the aqueous emulsion of the butadiene-1,3 hydrocarbon will also preferably contain a polymerization initiator since the presence of such a substance enables the polymerization to be started rapidly. The preferred initiators to be employed are peroxygen compounds including hydrogen peroxide, benzoyl peroxide, ammonium persulfate, potassium persulfate, sodium perborate and other peroxides and persalts although other types of initiators such as sulfur dioxide, sodium bisulfite, diazoaminobenzene and triphenylmethylazobenzene may also be used.

It is also especially desirable to employ a polymerization catalyst or accelerator during the polymerization in the presence of the 2-thiothiazyl modifiers of this invention. Water-soluble heavy metal compounds including both simple water-soluble heavy metal salts and complex water-soluble heavy metal compounds, particularly the water-soluble compounds of heavy metals occurring in group VIII of the first long period of the periodic table (i. e., iron, cobalt and nickel) such as cobaltous chloride, ferric sulfate, sodium ferri pyrophosphate, sodium cobaltinitrite, potassium ferricyanide and the like, are preferred catalysts for use with the modifiers of this invention since their presence greatly speeds up the polymerization rate and also assists in the production of products of the desired high quality. Another class of substances which may be employed to great advantage with the modifiers of this invention are the aliphatic mercaptans containing at least 12 carbon atoms such as lauryl mercaptan, triisobutyl mercaptan, cetyl mercaptan, octadecyl mercaptan and the like. These mercaptans act as accelerators for the polymerizations described and also have some modifying action, but the polymerization in presence of both a mercaptan and a modifier of the class described results in quite rapid polymerizations yielding high quality products which not only are plastic and easily processed like unvulcanized natural rubber but also are capable of yielding vulcanizates which are superior in strength and in other properties to natural rubber vulcanizates, a result which is not possible when employing only a mercaptan as the modifier.

The amounts of the 2-thiothiazyl modifier, as well as of the polymerization initiators and catalysts, if any, which are employed in the polymerization process may be varied widely depending upon the properties desired in the product as well as upon the particular substances present in the emulsion, and are not strictly critical. In general, however, the amount of the modifier will be between about 0.1 and 2.0% by weight based on the weight of polymerizable material present, the higher amounts giving products of greatest plasticity. The amount of the initiator need be only quite small, less than 1.0% based on the polymerizable material present while the amount of the catalyst will similarly be less than 1% in most instances and often less than 0.5%, particularly when the catalyst is a heavy metal compound. However, when mercaptans are employed with the thiazyl modifiers the amount of each may be between 0.1 and 1.0%, with the amounts of each of the two substantially equal, to good advantage. Generally there is no advantage in employing over 2% of any one of these ingredients or of over 5% of all these ingredients combined; and as little as 0.1% of each ingredient or even less is often quite effective, in the case of water-soluble heavy metal catalysts amounts as little as 0.01% or even less, often being preferable.

It is to be understood that the above discussion of the various ingredients present in the emulsion during polymerization is given only to show preferred procedures and that the polymerization of the butadiene-1,3 hydrocarbon in aqueous emulsion may be conducted in any desired manner, provided only that a 2-thiothiazyl compound of the character described is present in the emulsion during the polymerization.

The products obtained from the above-described emulsion polymerization process consists of latex-like dispersions containing butadiene-1,3 polymers or copolymers dispersed in an aqueous medium. Such synthetic latices may be treated in any desired manner and utilized in the same general manner as natural rubber latex. For example they may be subjected to distillation processes to remove the unpolymerized monomers if any; they may be treated to increase the size of the particles of polymer contained therein; they may be utilized as such either compounded or uncompounded in the production of synthetic rubber articles by deposition processes, coating processes and the like and they may be coagulated in any desired manner to produce a synthetic rubber coagulum closely resembling in plasticity and processability the unvulcanized natural crude rubber obtained from natural rubber latex. Such synthetic rubber may then be utilized in the same general manner as natural rubber to produce a wide variety of vulcanized and unvulcanized products which are often superior to natural rubber products in many properties.

To illustrate the practice of the invention and the desirable results to be obtained by employing the polymerization modifiers herein described, the following specific examples are cited but it is to be understood that wide variations may be effected therein in accordance with the foregoing disclosure without departing from the spirit and scope of the invention.

In the examples all parts are by weight.

Example I

A mixture of 75 parts of butadiene-1,3 and 25 parts of styrene was emulsified in 180 parts of water containing 5 parts of fatty acid soap, and then, after the addition of 0.35 part of potassium persulfate, 0.05 part of sodium pyrophosphate, 0.035 part of ferric sulfate, 0.012 part of cobaltous chloride and 0.6 part of benzothiazyl-2 benzoyl monosulfide, was polymerized by agitating the emulsion at a temperature of 50° C. for 15½ hours. A small amount of phenyl-beta-naphthylamine was then added to the latex-like dispersion obtained; the dispersion was coagulated and the resulting rubber-like polymer was washed and dried. The synthetic rubber obtained in a 77% yield was plastic, coherent, and easily milled on either a hot or cold mill, and was 36.5% soluble in benzene at 40° C. before being subjected to a breaking-down process. When compounded with conventional compounding and vulcanizing ingredients in a typical tire tread recipe and then vulcanized for 30 minutes at 290° F., a vulcanizate was produced which possessed a tensile strength of over 3000 lbs./sq. in. and an ultimate elongation of over 700%. A synthetic rubber prepared by a similar polymerization except that no benzothiazyl benzoyl monosulfide was included in the emulsion during the polymerization, was tough and non-plastic, insoluble in benzene before being milled, and was extremely difficult to work on a hot mill. Moreover, the synthetic rubber prepared in the absence of the benzothiazyl modifier possessed, when compounded and vulcanized in the same manner, a tensile strength of only about 2000 lbs./sq. in. and an elongation less than 300%.

Example II

The polymerization of Example I was repeated except that 0.40 part of 4-phenyl-thiazyl-2 thiomethylene hydrin was employed as the polymerization modifier in place of benzothiazyl-2 benzoyl monosulfide. An 89% yield of a synthetic rubber which was plastic, easily milled and 12.6% soluble in benzene when tested as above, was obtained in 15½ hours. When vulcanized in the manner described in Example I, the synthetic rubber obtained possessed a tensile strength of 2900 lbs./sq. in. and a 520% elongation.

Example III

A mixture of 75 parts of butadiene-1,3 and 25 parts of styrene was emulsified with 200 parts of a 5% aqueous soap solution and polymerized in the presence of 0.35 part of potassium persulfate and 0.60 part of 4-phenyl-thiazyl-2 benzoyl monosulfide. The polymerization required 22½ hours to produce an 85% yield of an excellent synthetic rubber which was 30.4% soluble in benzene, plastic and easily milled on a hot mill, and which when vulcanized possessed a tensile strength of 3600 lbs./sq. in. In the absence of the 4-phenyl-thiazyl-2 benzoyl monosulfide, the polymerization required over 41 hours to produce an 80% yield and the product was non-plastic, insoluble and possessed when vulcanized a tensile strength of about 2000 lbs./sq. in.

Example IV

Example III was repeated except that 0.2 part of lauryl mercaptan was substituted for 0.2 part of the 4-phenyl-thiazyl-2 benzoyl monosulfide present in the emulsion during the polymerization. An 85% yield of synthetic rubber was obtained in only 15½ hours and the product was 35.0% soluble in benzene and possessed when vulcanized a tensile strength of 3100 lbs./sq. in. When all of the 4-phenyl-thiazyl-2 benzoyl monosulfide was replaced by lauryl mercaptan, however, the polymerization yielded 75% of copolymer in 15½ hours and the product was only 15% soluble in benzene and possessed a tensile strength of only 2600 lbs./sq. in.

Example V

A mixture of 75 parts of butadiene-1,3 and 25 parts of acrylonitrile was emulsified with 250 parts of a 3% aqueous solution of myristic acid, 85% of which was present as the sodium soap, which solution also contained 0.35 part of hydrogen peroxide as a polymerization initiator, and 0.05 part of cobaltous chloride as a polymerization catalyst, and was polymerized at 30° C. in the presence of 0.65 part of 4,5-dimethyl-thiazyl-2 thiomethylene hydrin as a polymerization modifier. After 42 hours, a 95% yield of an excellent rubbery butadiene-1,3 acrylonitrile copolymer was obtained. The copolymer was soft, plastic and coherent, it was 30% soluble in benzene, it milled readily and when vulcanized it possessed tensile strengths of 4000–5000 lbs./sq. in. and elongations of 550–650%. In the absence of the modifier a non-plastic, non-coherent copolymer which was only about 1% soluble in benzene was obtained.

*Example VI*

An emulsion containing the following ingredients was prepared:

| | Parts |
|---|---|
| Butadiene-1,3 | 66 |
| Acrylonitrile | 54 |
| Hydrogen peroxide | 0.80 |
| Emulsifying solution (2% aqueous solution of myristic acid 85%, neutralized with sodium hydroxide) | 250.0 |
| Sodium pyrophosphate | 0.30 |
| Ferric sulfate | 0.05 |
| Cobaltous chloride | 0.005 |
| Sodium sulfate | 0.25 |
| Benzothiazyl-2 cyano monosulfide | 0.53 |

The emulsion was then polymerized for 16 hours at 30° C. whereupon a 93% yield of a plastic, soluble synthetic rubber closely resembling crude natural rubber was obtained by coagulating the polymerized emulsion. The synthetic rubber was easily milled on either a hot or cold mill and when vulcanized it possessed a tensile strength of 4500–5000 lbs./sq. in. and an ultimate elongation of 500–600%. In the absence of the benzothiazyl-2 cyano monosulfide a 90% yield of copolymer was obtained in 18 hours but the copolymer was tough, non-plastic and non-soluble and difficult to mill and when vulcanized possessed elongations of only 270–320%. When 2-mercaptobenzothiazole was employed in place of the benzothiazyl-2 cyano monosulfide the polymer obtained was plastic and soluble but the polymerization required 25 hours to produce a 90% yield, thus showing that the modifiers of this invention possess the advantages of the known modifiers and, in addition, enable higher yields of polymer to be obtained in shorter time.

*Example VII*

Example VI was repeated employing in place of the benzothiazyl-2 cyano monosulfide, 0.53 part of benzothiazyl-2 2-aminoethyl monosulfide. The polymerization required 25 hours at 30° C. to produce a 96% yield and the product obtained was a plastic easily-milled synthetic rubber resembling natural crude rubber which when vulcanized yielded strong resistant and resilient vulcanizates.

*Example VIII*

An emulsion similar to that described in Example VI except that 0.53 part of 4-phenylthiazyl-2 5-nitro benzothiazyl-2 monosulfide was employed in place of the benzothiazyl-2 cyano monosulfide. The polymerization required 16 hours to produce a 95% yield of an excellent rubbery copolymer which was plastic and easily milled and which yielded strong resistant and resilient vulcanizates.

*Examples IX to XI*

A mixture of 66 parts of butadiene-1,3 and 54 parts of acrylonitrile was emulsified with 250 parts of a 2% aqueous soap solution containing 0.6 part of hydrogen peroxide, 0.02 part of ferric sulfate and 0.02 part of cobaltous chloride. After the addition of 0.65 part of benzothiazyl-2 o-nitro-phenyl disulfide, the emulsion was polymerized at 30° C. After 18 hours, a 95% yield of a plastic soluble synthetic rubber possessing high tensile strength and elongation was obtained. Similar synthetic rubber products were also obtained when 0.91 part of quinolyl-2 5-nitro-benzothiazyl-2 monosulfide and 0.75 part of 4,5-dimethyl-thiazyl-2 anilino-methyl monosulfide were substituted for the benzothiazyl-2 o-nitrophenyl disulfide.

*Example XII*

An emulsion comprising a mixture of 55 parts of butadiene-1,3, 25 parts of acrylonitrile and 20 parts of methyl methacrylate as the polymerizable materials; sodium isobutyl naphthalene sulfonate as the emulsifying agent; hydrogen peroxide as the polymerization initiator and benzothiazyl-2 cyano monosulfide as the modifier, was polymerized at 40° C. There was obtained an excellent synthetic rubber which was more plastic and more soluble in benzene and which was more readily subjected to the processing operations employed with unvulcanized natural rubber, than was the rubber obtained in the absence of the thiazole, thus illustrating the effectiveness of the modifiers of this invention with mixtures comprising more than two polymerizable materials and in emulsions comprising emulsifying agents other than soap.

While the above examples illustrate preferred procedures and partially indicate the extent to which variations and modifications in nature and amounts of polymerizable materials, of modifiers and of other substances, may be made therein, it is to be understood that many other variations and modifications in polymerization methods will occur to those skilled in the art and are within the spirit and scope of the invention as defined by the appended claims.

We claim:

1. The method which comprises polymerizing in aqueous emulsion a butadiene-1,3 hydrocarbon in the presence of a compound of the formula

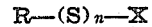

wherein R is a thiazyl-2 radical, $n$ is an integer from 1 to 4 and X is a monovalent organic radical, other than R, having its monovalency on a carbon atom.

2. The method which comprises polymerizing in aqueous emulsion a mixture of a butadiene-1,3 hydrocarbon and a compound copolymerizable therewith in aqueous emulsion, in the presence of a compound of the formula

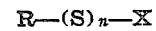

wherein R is a thiazyl-2 radical, $n$ is an integer from 1 to 4 and X is a monovalent organic radical, other than R, having its monovalency on a carbon atom.

3. The method of claim 2 further characterized in that the polymerization is carried out in the additional presence of an aliphatic mercaptan containing from 12 to 18 carbon atoms.

4. The method of claim 2 further characterized in that the polymerization is carried out in the additional presence of a water-soluble compound of a heavy metal occurring in group VIII and the first long period of the periodic table.

5. The method which comprises polymerizing in aqueous emulsion a mixture of butadiene-1,3 and styrene in the presence of a compound of the formula

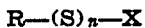

wherein R is a thiazyl-2 radical, n is an integer from 1 to 4, and X is a monovalent organic radical, other than R, having its monovalency on a carbon atom.

6. The method which comprises polymerizing in aqueous emulsion a mixture of butadiene-1,3 and acrylonitrile in the presence of a compound of the formula

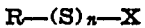

wherein R is a thiazyl-2 radical, n is an integer from 1 to 4, and X is a monovalent organic radical, other than R, having its monovalency on a carbon atom.

7. The method which comprises polymerizing in aqueous emulsion a butadiene-1,3 hydrocarbon in the presence of a compound of the formula

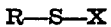

wherein R is a thiazyl-2 radical composed exclusively of a nitrogen atom present in the thiazole ring, a sulfur atom present in the thiazole ring and carbon and hydrogen atoms, and X is a monovalent organic radical, other than R, having its monovalency on a plurally bound carbon atom.

8. The method which comprises polymerizing in aqueous emulsion a mixture of butadiene-1,3 and a compound copolymerizable therewith in aqueous emulsion, in the presence of a compound of the formula

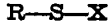

wherein R is a thiazyl-2 radical composed exclusively of a nitrogen atom present in the thiazole ring, a sulfur atom present in the thiazole ring and carbon and hydrogen atoms, and X is an oxygen-containing monovalent organic radical having its monovalency on a carbon atom.

9. The method which comprises polymerizing in aqueous emulsion a mixture of butadiene-1,3 and a compound copolymerizable therewith in aqueous emulsion, in the presence of a compound of the formula

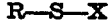

wherein R is a thiazyl-2 radical composed exclusively of a nitrogen atom present in the thiazole ring, a sulfur atom present in the thiazole ring, and carbon and hydrogen atoms, and X is a nitrogen-containing monovalent organic radical, other than R, having its monovalency on a carbon atom.

10. The method which comprises polymerizing in aqueous emulsion a mixture of butadiene-1,3 and a compound copolymerizable therewith in aqueous emulsion, in the presence of a compound of the formula

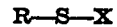

wherein R is a thiazyl-2 radical and X is an acyl radical.

11. The method which comprises polymerizing in aqueous emulsion a mixture of butadiene-1,3 and a compound copolymerizable therewith in aqueous emulsion, in the presence of a compound of the formula

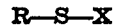

wherein R is a thiazyl-2 radical and X is $-C \equiv N$.

12. The method which comprises polymerizing in aqueous emulsion a mixture of butadiene-1,3 and styrene in the presence of benzothiazyl-2 benzoyl monosulfide.

13. The method of claim 12 further characterized in that the polymerization is carried out in the additional presence of an aliphatic mercaptan containing from 12 to 18 carbon atoms.

14. The method which comprises polymerizing in aqueous emulsion a mixture of butadiene-1,3 and acrylonitrile in the presence of benzothiazyl-2 cyano monosulfide.

15. The method of claim 14 further characterized in that the polymerization is carried out in the additional presence of a water-soluble compound of a heavy metal occurring in group VIII and the first long period of the periodic table.

16. The method which comprises polymerizing in aqueous emulsion a mixture of butadiene-1,3 and a compound copolymerizable therewith in aqueous emulsion, in the presence of a compound of the formula

wherein R is a thiazyl-2 radical and X is $-CH_2OH$.

17. The method which comprises polymerizing in aqueous emulsion a mixture of butadiene-1,3 and styrene in the presence of 4,5-dimethyl thiazyl-2 thiomethylene hydrin.

BENJAMIN M. G. ZWICKER.
WILLIAM D. STEWART.